Figure 5:
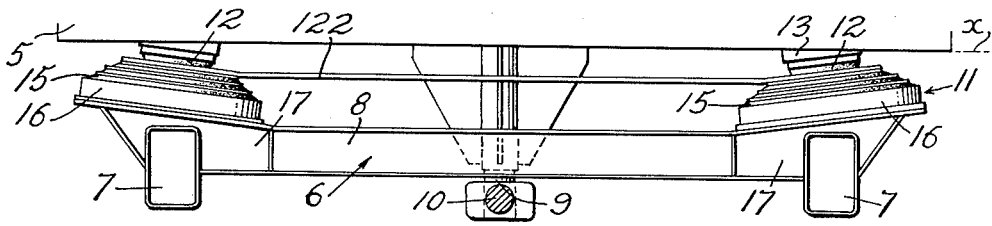

July 24, 1962
A. J. HIRST
3,045,998
SIDE BEARERS FOR RAILWAY VEHICLES
Filed July 30, 1959
2 Sheets-Sheet 1
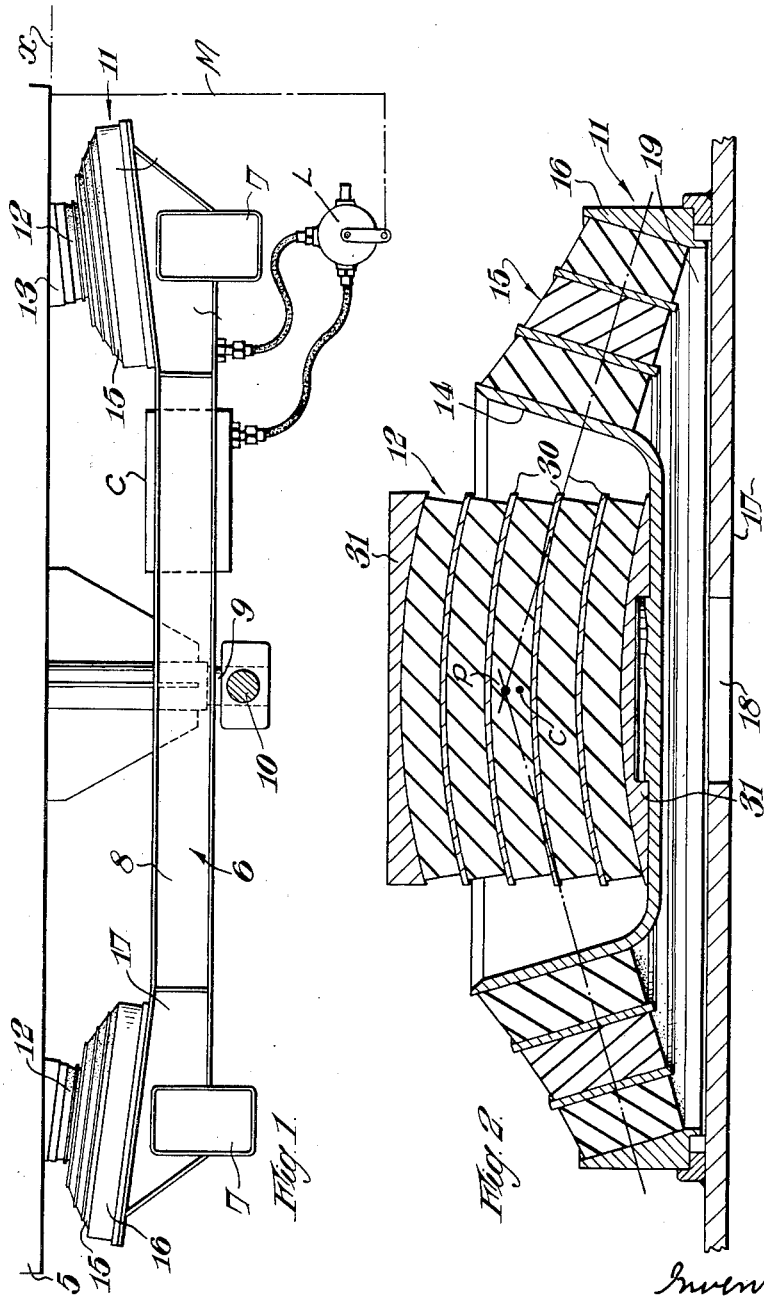
Inventor
Archie J. Hirst
By Ralph B. Stewart
Attorney July 24, 1962  A. J. HIRST  3,045,998
SIDE BEARERS FOR RAILWAY VEHICLES
Filed July 30, 1959  2 Sheets-Sheet 2

Inventor
Archie J. Hirst
By Ralph B. Stewart
Attorney

United States Patent Office 3,045,998
Patented July 24, 1962

3,045,998
SIDE BEARERS FOR RAILWAY VEHICLES
Archie John Hirst, Leicester, England, assignor to Metalastik Limited, Leicester, England, a company of Great Britain
Filed July 30, 1959, Ser. No. 830,651
Claims priority, application Great Britain Aug. 5, 1958
14 Claims. (Cl. 267—3)

This invention concerns railway vehicles of the type wherein the weight of the vehicle body is carried by side bearers which rest on a wheel-carrying frame e.g. the frame of a two-wheel or a four-wheel bogie. The side bearers accommodate vertical movements of the body relatively to the wheel frame and the object of the present invention is the provision of an improved side bearer assembly which also freely permits horizontal movements of the body relatively to the wheel-carrying frame (due, for instance, to lateral shock loads or to pivotal movement of the wheel frame about a vertical axis e.g. when negotiating horizontal curves). A further object is the provision of a side bearer assembly which permits the body of the vehicle to be maintained at a predetermined datum level with variations in the laden weight due, for example, to changes in the number of passengers and/or in the goods carried by the vehicle.

A further object of the present invention is to provide a side bearer having the above characteristics which permits relatively large vertical deflections of the body during operational running of the vehicle.

As applied to a four-wheel bogie, for example, it is customary for the side bearers to rest upon the solebars of the bogie. Though this arrangement is preferred in the present invention nevertheless it may be arranged that the side bearers are supported by any other suitable part of the wheel-carrying frame.

According to this invention a side bearer assembly comprises a rubber block which in use of the assembly acts mainly in compression to support the body from the wheel-carrying frame and which accommodates horizontal movements of the body relatively to the wheel-carrying frame mainly by shear deformation (so that such movements are freely permitted) and, in combination with said block, resilient means for supporting the block, said resilient means permitting a required vertical movement of the body relatively to the wheel-carrying frame.

According to a feature of this invention the resilient means may comprise a rubber assemblage which in use of the side bearer assembly acts in combined shear and compression and also accommodates horizontal movements of the body to a relatively small extent.

In this case it is preferred that the rubber assemblage be in the form of a frusto-conical ring with the rubber block lying, at least in part, within the ring.

According to a further feature of the invention, where a railway vehicle incorporates a side bearer assembly as just defined, the frusto-conical ring may constitute a deformable wall of a pneumatic chamber connected with a source of compressed air.

With the pneumatic chamber it is arranged that variations in the laden weight of the vehicle resulting in changes in the level of the body are counteracted by varying the prevailing pressure in the pneumatic chamber.

In an alternative arrangement the resilient means may be a pneumatic cushion itself enclosing the pneumatic chamber.

It is to be understood that the terms "horizontal" and "vertical" are used in this specification in relation to a railway vehicle assumed to be standing on a level track.

Reference to rubber is to be understood as including natural and synthetic rubbers and admixtures thereof.

The rubber block or ring may consist of a body of rubber alone but preferably comprises a body of rubber having metal interleaves and metal end plates, the interleaves and end plates being bonded to the rubber.

Figure 3:
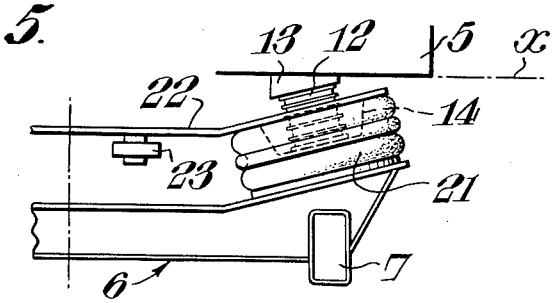
Figure 4:
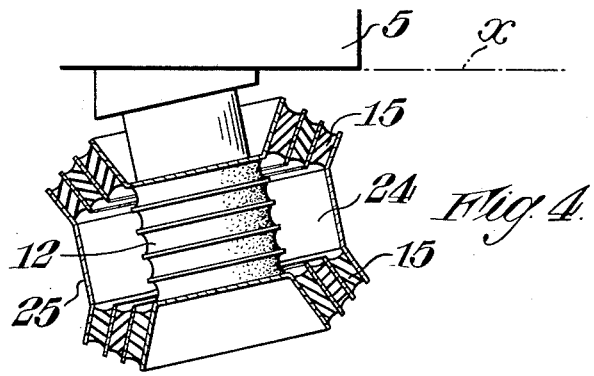

Practical applications of the present invention will now be described, by way of example only, with reference to the accompanying drawings whereof:

FIG. 1 is an end view of a part of a railway vehicle according to the present invention and showing a pair of side bearer assemblies according to the invention, FIG. 2 is a sectional view to a larger size of one of the side bearer assemblies of the vehicle of FIG. 1, FIG. 3 is a view, similar to FIG. 1 showing a part of a vehicle incorporating a side bearer assembly according to the invention which is of alternative construction, FIG. 4 is a sectional view of a further construction of side bearer assembly according to the invention, and FIG. 5 is a view corresponding to FIG. 1 and showing a modification of the arrangement shown in FIG. 1.

Referring to FIG. 1: the vehicle comprises a body 5 and a wheel-carrying frame or bogie generally indicated at 6. The bogie has solebars 7 and a transom 8. The body is connected to the bogie by a pin 9 and a longitudinal link 10 in known manner so that tractive and braking forces are applied to the body while permitting relative horizontal pivotal movement between the bogie 6 and body 5. Such movements occur when the vehicle is negotiating a horizontal curve.

Instead of the link 10, a number of alternative devices may be used including mountings with a number of intermediate plates, parallel motion devices, and toggle links to give a progressive rise in transverse stiffness with increasing deflection.

A side-bear assembly (which is generally indicated by the reference numeral 11) is provided at each side of the vehicle between the body and the solebar 7.

Each side bearer comprises a rubber block 12 the top end of which is secured to a wedge 13 and the lower end of which is supported by the base of a rigid metal cup 14. The block 12 comprises end plates for attachment to the wedge 13 and the cup 14 and interleaves, the rubber of the block being in the form of discs bonded to the interleaves and to the end plates.

Resilient means in the form of a frusto-conical rubber ring 15 surrounds the cup 14 and is held between the cup and a wedge-shaped ring 16 attached to the bogie 6. The frusto-conical side wall of the cup 14 and the ring 16 constitute end plates of the ring 15 which also has metal interleaves, the interleaves and the end plates being bonded to the rubber of the ring.

The ring 15 is of relatively large diameter and of small height.

Block 12 lies partly within ring 15 so that the overall height of the side bearer assembly is relatively small. This is an advantage since the space between the body 5 and the bogie 6 is commonly much restricted.

An air chamber 17 in the frame 6 is located immediately below each side bearer and this communicates through hole 18 with an air space 19 immediately beneath ring 15 and formed between the ring and the base of the cup on one side and a surface of the frame on the other side. The ring 15 thus constitutes a deformable wall of a pneumatic chamber formed by the chamber 17 and the space 19. Chamber 17 is connected with a source of compressed air C such, for example, as the compressed air supply for the vehicle brakes. By varying the prevailing pressure in the chamber 17 the load which can be supported is correspondingly changed. The supply of compressed air to the chamber 17 is regulated by a levelling valve actuated, in known manner, by actuating means, indicated by the chain-dotted line M in FIG. 1, responsive to changes in the datum height of the body e.g. changes in height above the ground. Upon variations in the datum height the levelling valve either supplies compressed air to the chamber 17 or permits escape of air therefrom. The effect is that the body 5 is maintained at said datum level, indicated diagrammatically at *x*. This has the advantage that with variations in the number of passengers and/or the amount of goods carried the height of the body 5 is held constant at the datum *x*. With variations in the laden weight the datum height of the body will also change due to deflection at the axle-box springs. The levelling valve will regulate the prevailing pressure in chamber 17 to compensate for axle-box deflection also.

The vertical loads due to the body 5 are applied to the rubber block 12 mainly in compression so that the vertical deflection of the side bearer due to the block is relatively small. However, the ring 15 under vertical loads acts in combined shear and compression and largely in shear so that the vertical deflections permitted to the body by the ring 15 are relatively large. Lateral movements between the bogie 6 and the body 5 due, for instance, to transverse shock loads are substantially wholly resisted by the ring 15 acting in compression but are accommodated by the block 12 acting mainly in shear. Accordingly the resistance to such lateral movements is relatively small. Similarly when the bogie 6 rotates about the axis 10 relatively to the body 5 the block 12 acts in shear so that once again the resistance to such movement is relatively small. Finally, the datum level of the body 5 is maintained constant, or substantially constant, with variations in the laden weight.

The rubber assembly 12, 15 is designed to carry the tare load and additional passenger and/or goods weight is catered for by the air pressure in the chamber 17. When the vehicle is unladen the air pressure is therefore atmospheric and consequently the empty vehicle can be shunted and run on the track, otherwise then in normal operating service, with the vehicle body 5 at the datum height *x* without relative pressure in the chamber 17—as would normally be the case if the chamber was supplied from the compressed-air brake system.

As will be apparent from FIG. 1 the diameter of the assembly 12, 15 is relatively great (which is not a disadvantage in most cases) and the height thereof is small, which is commonly essential.

The rubber assemblage 15 has its effective point of suspension P slightly above the geometrical centre C of block 12 thereby assisting the stability of the side bearer assembly whereby the lateral stiffness remains substantially constant between tare and full load. Even so because of the small height (axial length) of assemblage 15 and the considerable thickness of the assemblage (as measured between cup 14 and ring 16) the assemblage may not be sufficiently stable and it may therefore be incapable of resisting the bending movement produced when the vertical load on block 12 is displaced sideways (or offset) due to relative horizontal movement between the body and the bogie. The stability may be further increased by adopting the construction of block 12 shown in FIG. 2 wherein the block comprises part-spherical interleaves 30 the concave surfaces of which face downwardly. The end plates 31 are also of part-spherical form. Thus the upper end plate has a downwardly facing part spherical concave surface bonded to the rubber and the upper end plate has an upwardly facing part spherical convex surface bonded to the rubber. The part-spherical form of interleaves 30 bonded to the rubber discs gives to cup 14 a tendency to deflect conically in the direction opposite to that in which it would be moved by offsetting the vertical load thereby counteracting the tendency just referred to. The part-spherical form in conjunction with the location of the effective point of the suspension referred to provides a positive stability, the side bearer then acting in similar manner to the well-known swing link. Thus, the side bearer when displaced horizontally creates a horizontal restoring force so that stability is assured and the stiffness rate of the side bearer is maintained substantially constant throughout the operating range.

The levelling valve, when the bearer is used in passenger coaches for suburban service, is preferably designed to give rapid admission of air when the train is stationary and slow admission when the train is moving. The valve may be controlled by sliding doors and be regulated also by a time-control device.

The volume of air in chamber 17 may be so selected as to give constant dynamic stiffness to the side bearer assembly irrespective of the supported load.

It will be appreciated that the side bearer assemblies 11 as described may be installed up-side-down (in relation to the manner of installation described and shown in FIG. 1) without altering their characteristics in any way. In that case the chambers 17, instead of being in the frame 6, would be provided in the body 5 of the vehicle immediately above the rings 15.

Referring now to FIG. 3: the arrangement is generally as described with reference to FIG. 1 wherein, however, the cup 14 is supported by a pneumatic cushion 21 the upper end of which is secured to the cup and the lower end of which is attached to the bogie 6. The pneumatic cushion 21 is connected to the cup 14 and to the bogie 6 in airtight manner so as to enclose a pneumatic chamber and is supplied with air under pressure e.g. from the brake system, in the manner indicated above.

The cup 14, which in this example forms part of the upper wall of the cushion, constitutes a recess in the cushion, the recess receiving the block 12.

The side bearers are arranged in pairs spaced apart transversely of the vehicle and the cups 14 of each pair are joined together by a rigid plank 22 which extends transversely of the body 5 thereby to assist in the stability of the suspension. In a similar way the arrangement shown in FIG. 1 may be modified by joining the cups 14 of the assemblies 11 together by a rigid plank 122 as shown in FIG. 5 so as further to assist the stability of the suspension.

Reverting to the FIG. 3 construction, each cushion 21 has associated with it a longitudinally extending link 23 connected at one end to the plank 22 adjacent the cushion and at its other end to a transom bracket (not shown).

Unlike the planks 22, the links 23 are hinged at each end preferably by hinge joints employing rubber bushes so as to allow sufficient relative movement between the planks 22 and the bogie frame. The links 23 further assist in the stability of the suspension.

The block 12 in the FIG. 3 construction permits freedom of pivotal and transverse movements of the bogie 6 relatively to the body 5 in the manner already described with reference to FIGS. 1 and 2. The required vertical deflection is provided by the pneumatic cushions 21 which enable the body 5 to be maintained at a datum height in the manner described above. The assembly of FIG. 3 may be inverted if desired without altering its characteristics.

In the arrangement of FIG. 4 the rubber assemblage is constituted by a pair of frusto-conical rings 15 one connected at its inner periphery to each end of the block 12 the block lying within and between the rings with the rings rigidly interconnected at their outer peripheries and lying with their imaginary apices directed away from one another as shown. A pneumatic chamber 24 is provided by encircling the rings 15 with a sleeve 25 which rigidly interconnects the outer end plates of the rings. The pneumatic chamber 24 is supplied with compressed air in the manner indicated above so that the body 5 will be automatically maintained at a predetermined datum. The block 12 and the rings 15 act to support the body 5 on the bogie 6 in the manner already referred to and are provided with metal interleaves as before.

The inner end plate of each ring is formed by the frusto-conical side wall of a metal cup as before, and the block 12 is secured between the bases of the cups.

The rings 15 and sleeve 25 connecting them form an inverted strut with the consequence that block 12 (under a given load) may be unstable and provide for a larger deflection relatively to its thickness than would be possible if block 12 were to be stable under that load. On the addition of further load the inverted strut becomes shorter and loses some stability but the consequent increase in air pressure to chamber 24 to maintain the datum level lengthens the strut and such increase in length considerably affects the instability of block 12 in a sense to compensate for the loss of stability of the inverted strut.

I claim:

1. A side bearer assembly for a railway vehicle for supporting the body of the vehicle from a wheel-carrying frame thereof, the assembly comprising a rubber block which is use of the assembly acts mainly in compression to support the body from the wheel-carrying frame and which accommodates horizontal movements of the body relatively to the wheel-carrying frame mainly by shear deformation so that such movements are readily permitted, and connected with the block at one end of the block a frusto-conical rubber ring which in use of the assembly acts in combined shear and compression to support the body from the wheel-carrying frame, said frusto-conical rubber ring permitting vertical movement of the body relatively to the wheel-carrying frame, the rubber block lying at least in part within the frusto-conical rubber ring.

2. A side bearer assembly as claimed in claim 1, wherein the effective point of suspension of the frusto-conical rubber ring lies at a point on the side of the geometrical centre of said rubber block remote from said one end of the block.

3. A side bearer assembly as claimed in claim 1, wherein the rubber block comprises a body of rubber having metal interleaves and metal end plates, the interleaves and end plates being bonded to the rubber.

4. A side bearer assembly as claimed in claim 3, wherein the metal interleaves are part spherical in shape, the concave surfaces of the interleaves facing towards said one end of the block.

5. A side bearer assembly as claimed in claim 4, wherein the end plate at said one end of the block has a part spherical convex surface bonded to the rubber, and the end plate at the other end of the block has a part spherical concave surface bonded to the rubber.

6. A side bearer assembly as claimed in claim 1, wherein the frusto-conical ring comprises a body of rubber having metal interleaves and metal end plates, the interleaves and end plates being bonded to the rubber.

7. A side bearer assembly as claimed in claim 1, wherein the frusto-conical ring comprises a body of rubber having metal interleaves, an outer metal end plate, and an inner metal end plate which is constituted by a frusto-conical side wall of a metal cup which receives the rubber block, the block being attached at said one end to the base of the cup, said metal interleaves and said end plates being bonded to the rubber.

8. In a railway vehicle comprising a body and a wheel-carrying frame; a side bearer assembly supporting the body of the vehicle from the wheel-carrying frame, the assembly comprising a first element and a second element, the first element being supported on the wheel-carrying frame and itself supporting the second element which in turn supports the body of the vehicle, one of said elements being constituted by a rubber block, which acts mainly in compression to support the vehicle body from the wheel-carrying frame and which accommodates horizontal movements of the body relatively to the wheel-carrying frame mainly by shear deformation so that such movements are readily permitted and the other of said elements being constituted by a frusto-conical rubber ring which acts in combined shear and compression to support the vehicle body from the wheel-carrying frame and which permits vertical movement of the vehicle body relatively to the wheel-carrying frame and also horizontal movements to a relatively small extent, the rubber block being connected to the frusto-conical rubber ring at one end and lying at least in part within the ring.

9. A railway vehicle as claimed in claim 8, wherein the frusto-conical rubber ring constitutes a deformable wall of a pneumatic chamber connected with a source of compressed air.

10. A railway vehicle as claimed in claim 9, further comprising valve means connected to control the supply of compressed air to and the exhaust of compressed air from said pneumatic chamber, and valve actuating means responsive to change of level of the body of the vehicle from a datum level corresponding with the body level under tare load conditions and connected to control the valve means to maintain the body level constant at said datum level regardless of change of load in the vehicle, the pressure in said pneumatic chamber being atmospheric at tare load.

11. A railway vehicle as claimed in claim 9, wherein the frusto-conical rubber ring is supported on the wheel-carrying frame of the vehicle and in turn supports said rubber block, and said pneumatic chamber is formed in part in the wheel-carrying frame.

12. In a railway vehicle comprising a vehicle body and a wheel carrying frame; a side bearer assembly comprising a rubber block connected at one end to the vehicle body and at the other end to the base of a cup having a frusto-conical side wall which forms an inner metal end plate of a frusto-conical rubber ring assemblage having an outer metal end plate connected to the wheel carrying frame, the block lying in part within the ring assemblage.

13. A railway vehicle as claimed in claim 12, wherein said ring and the base of said cup enclose an air tight space with a surface of the wheel carrying frame which space communicates with a pneumatic chamber in the frame, said chamber being connected with a source of compressed air.

14. A railway vehicle as claimed in claim 12, comprising a pair of said side bearer assemblies supporting the body of the vehicle from said wheel carrying frame, said assemblies being spaced apart transversely of the vehicle and having their cups interconnected by a rigid plank.

References Cited in the file of this patent

UNITED STATES PATENTS

| | | |
|---|---|---|
| 1,108,488 | Bugg | Aug. 25, 1914 |
| 2,573,108 | Piron | Oct. 30, 1951 |
| 2,827,282 | Weiss | Mar. 18, 1958 |
| 2,883,179 | Dean et al. | Apr. 21, 1959 |
| 2,883,180 | Moulton | Apr. 21, 1959 |

FOREIGN PATENTS

| | | |
|---|---|---|
| 616,002 | Germany | July 17, 1935 |
| 524,287 | Great Britain | Aug. 2, 1940 |
| 957,723 | France | Aug. 29, 1949 |